(12) United States Patent
Boersma et al.

(10) Patent No.: US 9,170,771 B2
(45) Date of Patent: *Oct. 27, 2015

(54) RESIDUE-BASED ERROR DETECTION FOR A PROCESSOR EXECUTION UNIT THAT SUPPORTS VECTOR OPERATIONS

(71) Applicant: INTERNATIONAL BUSINESS MACHINES CORPORATION, Armonk, NY (US)

(72) Inventors: Maarten Boersma, Holzgerlingen (DE); Juergen Haess, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/182,415

(22) Filed: Feb. 18, 2014

(65) Prior Publication Data

US 2014/0164462 A1    Jun. 12, 2014

Related U.S. Application Data

(63) Continuation of application No. 13/367,032, filed on Feb. 6, 2012, now Pat. No. 8,984,039.

(51) Int. Cl.
| | |
|---|---|
| *G06F 7/38* | (2006.01) |
| *G06F 7/483* | (2006.01) |
| *G06F 7/544* | (2006.01) |
| *G06F 7/72* | (2006.01) |
| *G06F 11/10* | (2006.01) |

(52) U.S. Cl.
CPC ............. *G06F 7/38* (2013.01); *G06F 11/1008* (2013.01); *G06F 7/483* (2013.01); *G06F 7/5443* (2013.01); *G06F 7/72* (2013.01)

(58) Field of Classification Search
None
See application file for complete search history.

(56) References Cited

U.S. PATENT DOCUMENTS

| 3,980,874 A | 9/1976 | Vora |
|---|---|---|
| 4,190,893 A | 2/1980 | Gajski |

(Continued)

FOREIGN PATENT DOCUMENTS

| GB | 2456406 B | 2/2012 |
|---|---|---|
| GB | 2456624 B | 5/2012 |

OTHER PUBLICATIONS

U.S. Appl. No. 13/367,032 entitled "Residue-Based Error Detection for a Processor Execution Unit That Supports Vector Operations"; Notice of Allowance dated Nov. 5, 2014 (5 pp).

(Continued)

*Primary Examiner* — Chat Do
*Assistant Examiner* — Matthew Sandifer
(74) *Attorney, Agent, or Firm* — Yudell Isidore PLLC; Steven Bennett

(57) ABSTRACT

A residue generating circuit for an execution unit that supports vector operations includes an operand register and a residue generator coupled to the operand register. The residue generator includes a first residue generation tree coupled to a first section of the operand register and a second residue generation tree coupled to a second section of the operand register. The first residue generation tree is configured to generate a first residue for first data included in the first section of the operand register. The second residue generation tree is configured to generate a second residue for second data included in a second section of the operand register. The first section of the operand register includes a different number of register bits than the second section of the operand register.

6 Claims, 11 Drawing Sheets

(56) References Cited

U.S. PATENT DOCUMENTS

| | | |
|---|---|---|
| 4,538,238 A | 8/1985 | Circello et al. |
| 5,761,103 A | 6/1998 | Oakland et al. |
| 7,555,692 B1 | 6/2009 | Lacobovici |
| 7,769,795 B1 | 8/2010 | Lacobovici |
| 2008/0010332 A1 | 1/2008 | Shen |
| 2010/0100578 A1 | 4/2010 | Dao et al. |
| 2010/0146027 A1 | 6/2010 | Dao et al. |

OTHER PUBLICATIONS

U.S. Appl. No. 13/367,032 entitled "Residue-Based Error Detection for a Processor Execution Unit That Supports Vector Operations"; Non-Final office action dated Apr. 14, 2014 (15 pp).

RESIDUE-BASED ERROR DETECTION FOR A PROCESSOR EXECUTION UNIT THAT SUPPORTS VECTOR OPERATIONS

This application is a continuation of U.S. patent application Ser. No. 13/367,032 entitled "RESIDUE-BASED ERROR DETECTION FOR A PROCESSOR EXECUTION UNIT THAT SUPPORTS VECTOR OPERATIONS," by Maarten Boersma et al., filed on Feb. 6, 2012, the disclosure of which is hereby incorporated herein by reference in its entirety for all purposes.

BACKGROUND

1. Field

This disclosure relates generally to error detection for an execution unit of a processor and, more particularly, to residue-based error detection for a processor execution unit that supports vector operations.

2. Related Art

Today, it is common for processors to be designed to detect errors. For example, one known processor design has implemented two identical processor pipelines. In this processor design, processor errors are detected by comparing results of the two identical processor pipelines. While duplicating processor pipelines improves error detection, duplicating processor pipelines is relatively expensive in terms of integrated circuit (chip) area and chip power consumption. A less expensive technique (e.g., in terms of chip area and power consumption) for detecting errors in an execution unit of a processor has employed residue checking.

Residue-based error detection (or residue checking) has been widely employed in various applications. For example, U.S. Pat. No. 3,816,728 (hereinafter "the '728 patent") discloses a modulo 9 residue checking circuit for detecting errors in decimal addition operations. As another example, U.S. Pat. No. 4,926,374 (hereinafter "the '374 patent") discloses a residue checking apparatus that is configured to detect errors in addition, subtraction, multiplication, division, and square root operations. As yet another example, U.S. Pat. No. 7,555,692 (hereinafter "the '692 patent") discloses logic for computing residues for full-sized data and reduce-sized data.

SUMMARY

According to one aspect of the present disclosure, a residue generating circuit for an execution unit that supports vector operations includes an operand register and a residue generator coupled to the operand register. The residue generator includes a first residue generation tree coupled to a first section of the operand register and a second residue generation tree coupled to a second section of the operand register. The first residue generation tree is configured to generate a first residue for first data included in the first section of the operand register. The second residue generation tree is configured to generate a second residue for second data included in a second section of the operand register. The first section of the operand register includes a different number of register bits than the second section of the operand register.

Configuring a residue-generation tree to be split into multiple residue generation trees facilitates residue checking multiple independent vector instruction operands within a full width dataflow in parallel or alternatively residue checking a full width operand of a standard instruction.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
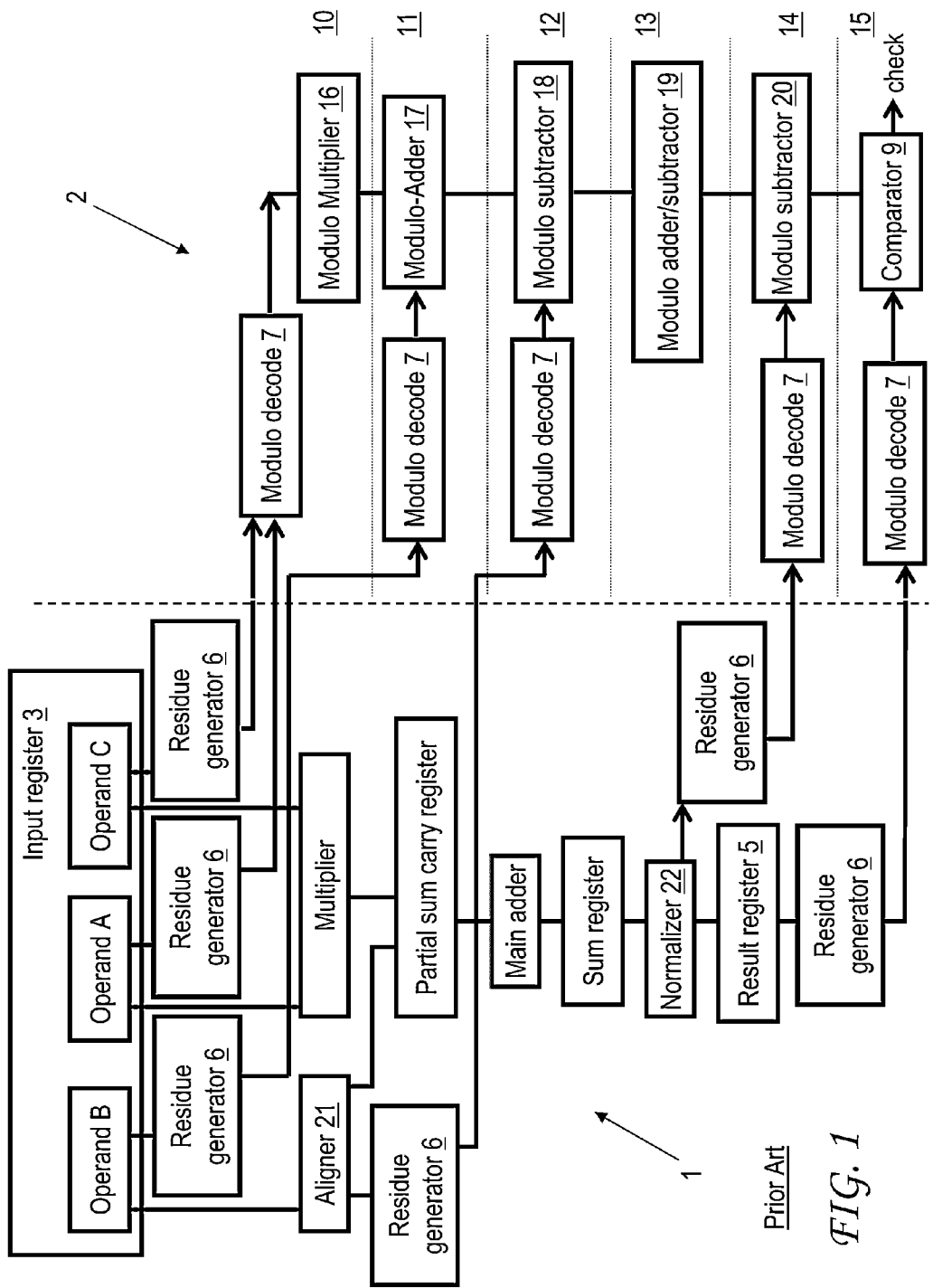
FIG. 1 is a diagram illustrating a relevant portion of an exemplary floating point unit (FPU) and an associated exemplary conventional residue generator.

As will be appreciated by one of ordinary skill in the art, the present invention may be embodied as a method, system, device, or computer program product. Accordingly, the present invention may take the form of an embodiment including hardware, an embodiment including software (including firmware, resident software, microcode, etc.), or an embodiment combining software and hardware aspects that may all generally be referred to herein as a circuit, module, or system. The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device.

According to the present disclosure, techniques are implemented to simultaneously allow multiple short format operands (which may have different sizes) to be processed in parallel while performing residue-based error checking on each of the short format operands or to alternatively performing residue-based error checking on a single long format operand. For example, performing vector operations on two or more short format operands included in a single dataflow in parallel reduces the time for processing the two short format operands. As used herein the term "coupled" includes a direct electrical connection between elements or blocks and an indirect electrical connection between elements or blocks achieved using one or more intervening elements or blocks. The term 'residue checking', as used herein, refers to the use of the mathematical residues of operands, results, and remainders to verify the result of a mathematical operation. As used herein, the term 'residue' refers to the remainder produced by modulo-N division of a number.

While the discussion herein focuses on a residue generator for a floating-point unit (FPU), it is contemplated that a residue generator configured according to the present disclosure has broad application to other type of execution units (e.g., vectorized execution units such as single-instruction multiple data (SIMD) execution units). While the discussion herein focuses on modulo 15, it should be appreciated that other modulos (e.g., modulo 3) may be utilized in a residue generator configured according to the present disclosure. Moreover, while the discussion herein focuses on an operand register with thirty-two bits, it should be appreciated that the techniques disclosed herein are applicable to operand registers with more or less than thirty-two bits. Additionally, while the discussion herein focuses on short format operands with twelve bits, it should be appreciated that the techniques disclosed herein are applicable to short format operands with more or less than twelve bits (e.g., twenty-three bits). In addition, while the discussion herein focuses on long format operands with thirty-two bits, it should be appreciated that the techniques disclosed herein are applicable to long format operands with more or less than thirty-two bits (e.g., a floating point format that employs fifty-two bits).

With reference to FIG. 1, an exemplary conventional floating point unit (FPU) of a processor (that includes a residue checking apparatus that performs residue checking for detecting errors in arithmetic floating-point operations, such as addition, subtraction, multiplication, division, square root, or convert operations) is illustrated. Residue checking is performed within a residue checking flow 2, by performing the same operations on the residue as those performed on operands by the FPU, in parallel with data flow 1 within the FPU. Operands A, B and C are provided by an input register 3 in data flow 1. Operands A, B and C are processed differently based on different functional elements, such as aligner 21 and normalizer 22, and a result is provided by a result register 5. Residues are generated at illustrated positions within data flow 1 by residue generators 6. Modulo decoders 7, which are coupled to residue generators 6, provide residue modulos to different functional elements (i.e., modulo multiplier 16, modulo adder 17, modulo subtractor 18, modulo subtractor 20, and comparator 9) within flow 2.

In a first stage 10 of flow 2, the residue modulos of operands A and B are multiplied by modulo multiplier 16. In a second stage 11 of flow 2, the residue modulo from operand B is added to the product-residue modulo from stage 10 using modulo adder 17. In a third stage 12 of flow 2, the residue modulo of bits lost at aligner 21 is subtracted by modulo subtractor 18 from the sum of second stage 11. During the residue checking operation, residue corrections to the actual residue value corresponding to the manipulated data in flow 1 may be necessary. For example, a small correction amount such as +/−1 may be necessary. As such, in a fourth stage 13 of checking flow 2, residue correction of +/−1 is performed by modulo adder/subtractor 19. Then, in a fifth stage 14 of flow 2, a subtraction of the bits lost at normalizer 22 is performed by modulo subtractor 20. Finally, in a sixth stage 15 of flow 2, a check operation is performed by comparator 9. That is, comparator 9 compares the result provided by modulo subtractor 20 with the residue modulo of the result provided by result register 5 of flow 1.

Figure 2:
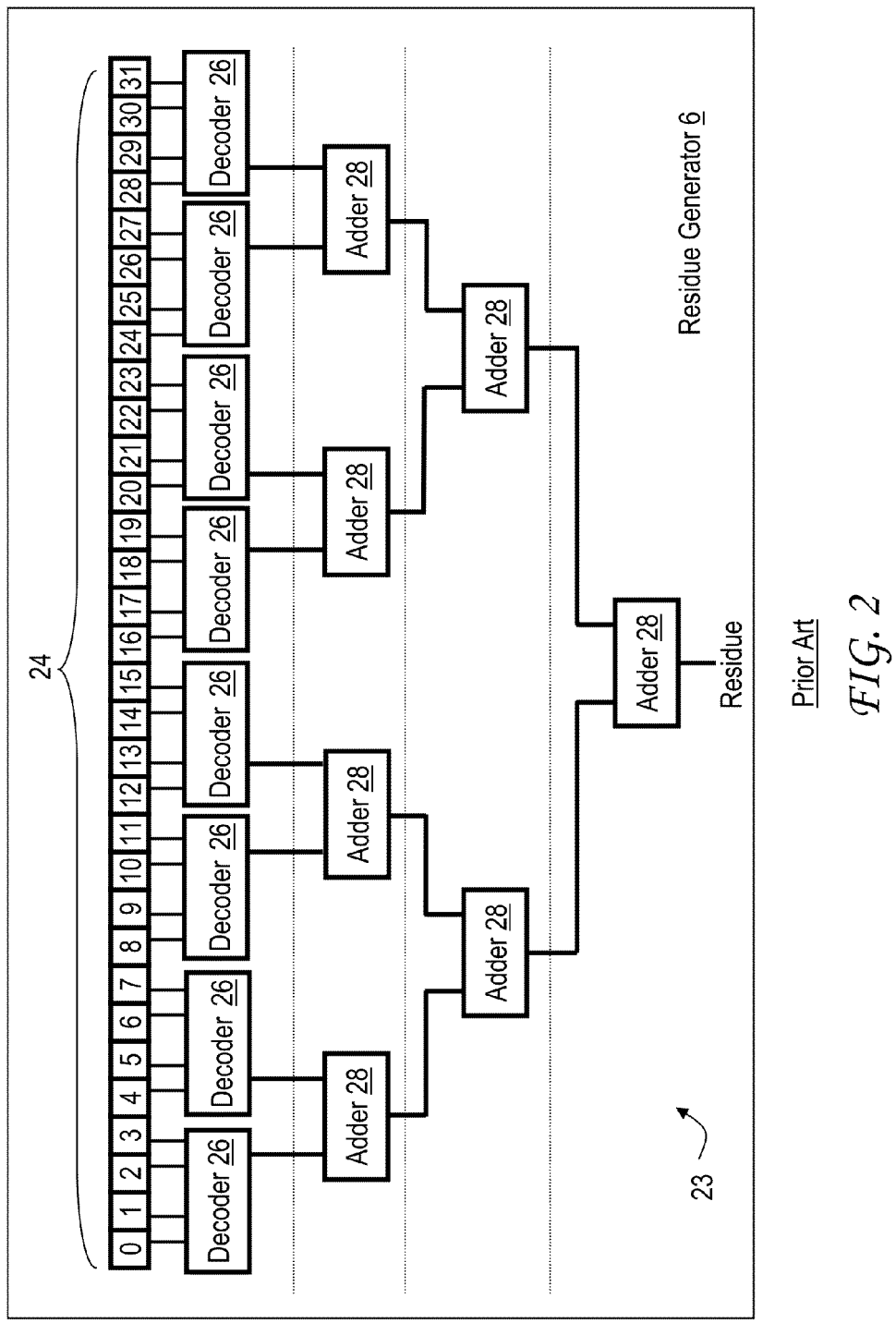
FIG. 2 is a diagram illustrating a relevant portion of an exemplary residue generation tree for the residue generator of FIG. 1.

With reference to FIG. 2, an exemplary conventional modulo 15 residue generation tree 23, for residue generator 6, is illustrated. As shown in FIG. 2, operand register 24 is configured to store thirty-two bits of an operand, starting with a most significant bit (MSB) in the register labeled '0' and ending with a least significant bit (LSB) in the register labeled '31'. The residue generation tree 23 includes a plurality of modulo 15 decoders 26 and a plurality of modulo adders (residue condensers) 28. Each decoder 26 is connected with four adjacent register bits of operand register 24 (for receiving four parallel bits of numerical data) and each decoder 26 decodes the numerical data received from the respective register bits.

For example, decoders 26 transform coded signals in binary format into decoded signals which are modulo remainders. Modulo adders 28, positioned at different levels, receive the decoded numerical data from decoders 26. Each adder 28 in a second and third condenser stage is connected to two adders 28 from a previous stage. According to $m=2^b-1$, four segment bits (b=4) are required for modulo 15 (i.e., m=15). According to w=p*b, for an operand that includes thirty-two bits (w=32), eight decoders (p=8) are required. In residue generation tree 23, an operand provided to an input of residue generator 6 may not use all of the input bits, as floating-point data includes a mantissa and an exponent that is extracted and handled separately. As such, register bits of an operand in operand register 24 that would include exponent bits may be filled with logical zeros (or other bits that do not affect the residue).

Figure 3:
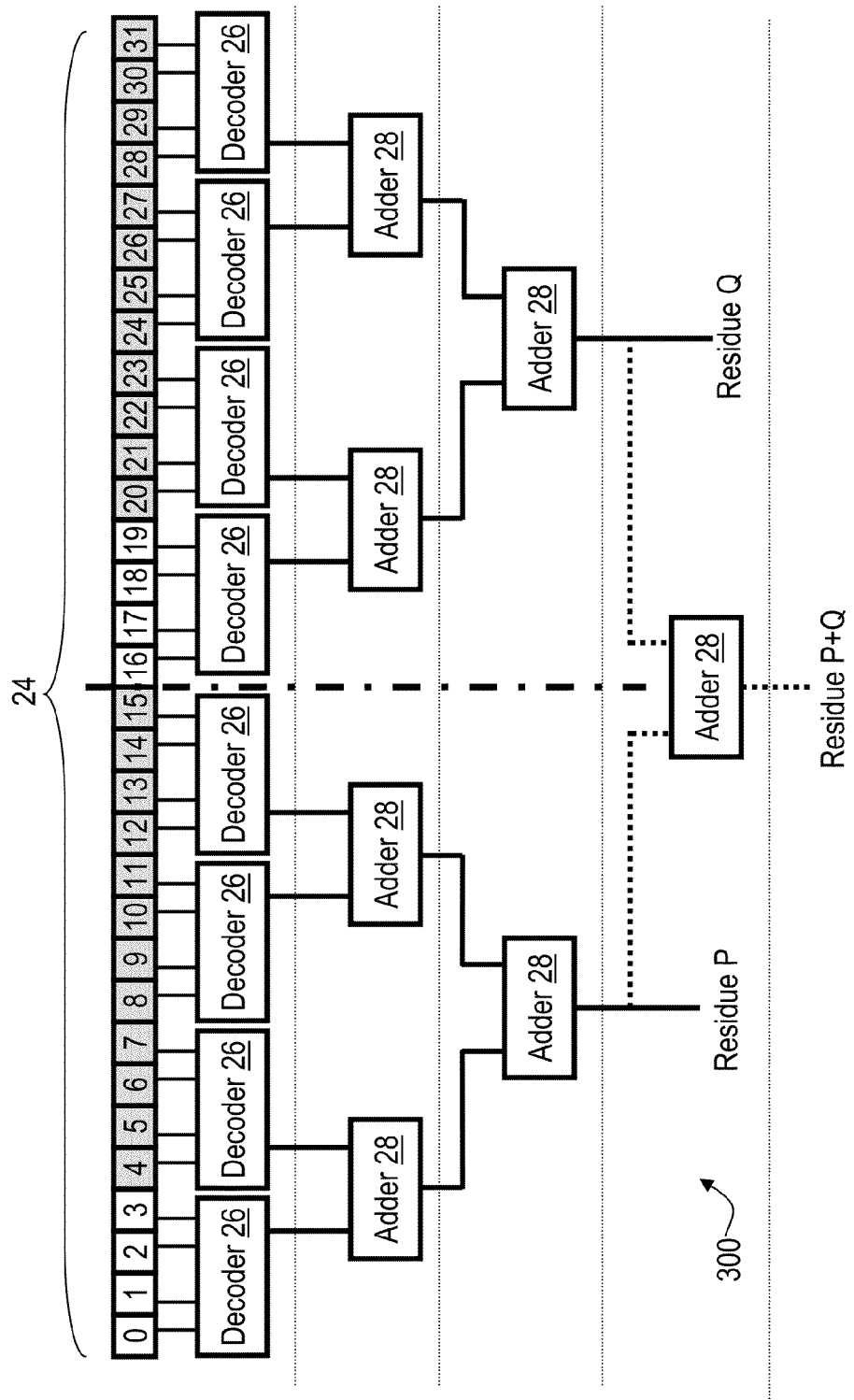
FIG. 3 is a diagram illustrating a symmetrical split data width residue generation tree for a residue generator configured according to an embodiment of the present disclosure to handle two right-aligned operands.

With reference to FIG. 3, an exemplary modulo 15 residue generation tree 300, that may be implemented in a residue generator 806 (see FIG. 8), is illustrated. Operand register 24 may be configured to store thirty-two bits of a long format operand, starting with an MSB in the register labeled '0' and ending with an LSB in the register labeled '31'. Operand register 24 may also be symmetrically divided and configured to store two short format operands (with an operand 'P' included in the registers labeled 0-15 and an operand 'Q' included in the registers labeled 16-31). As illustrated in FIG. 3, operands 'P' and 'Q' are right-aligned within their respective halves of operand register 24, operand 'P' is stored in the registers labeled 4-15, and operand 'Q' is stored in the registers labeled 20-31. Similar to residue generation tree 23 of FIG. 2, residue generation tree 300 of FIG. 3 includes a plurality of modulo 15 decoders 26 and a plurality of modulo adders (residue condensers) 28. Each decoder 26 is coupled to four adjacent register bits of operand register 24 (for receiving four parallel bits of numerical data) and each decoder 26 decodes the numerical data received from the respective register bits.

As previously noted, decoders 26 transform coded signals into decoded signals that are modulo remainders. Modulo adders 28, positioned at different levels, receive the decoded numerical data from decoders 26. Adders 28 may, for example, be replaced with a series of decoders and multiplexers that perform residue condensing. Outputs of each adjacent pair of decoders 26 are coupled to inputs of a different adder 28 in a first condenser stage. Inputs of each adder 28 in a second condenser stage are coupled to respective outputs of two adders 28 in the first condenser stage. An output of each adder 28 in the second condenser stage may be configured to generate a different residue for a short format operand or may be coupled to respective inputs of an adder 28 in a third condenser stage. In this case, an output of an adder 28 in the third condenser stage is configured to generate a residue for a long format operand. In residue generation tree 300, an operand provided to register 24 may not use all of the input bits. In this case, register bits of an operand in operand register 24 that are not used may be filled with logical zeros (or other bits that do not affect the residue) by unillustrated control logic.

Right-aligning short format operands within their respective register sections of a dataflow (as shown in FIG. 3) is one approach for aligning short format operands within respective register sections without optimization. In general, there may be reasons to align short format operands within their respective register sections differently. For example, a left operand may be left-aligned to make use of existing full data width overflow detection of bit '0'. In general, symmetrically splitting an operand register into equal halves is the intuitive way of splitting an operand register for vector operations. However, depending on the purpose for splitting an operand register, an asymmetrical split of the operand register may be desirable. For example, as single precision floating-point data of twenty-three bits does not correspond to one-half of double precision floating-point data of fifty-two bits, a split after bits '0' through '22' may be an appropriate way of splitting an operand register of fifty-two bits into two unequal sized sections for two short format operands.

Figure 4:
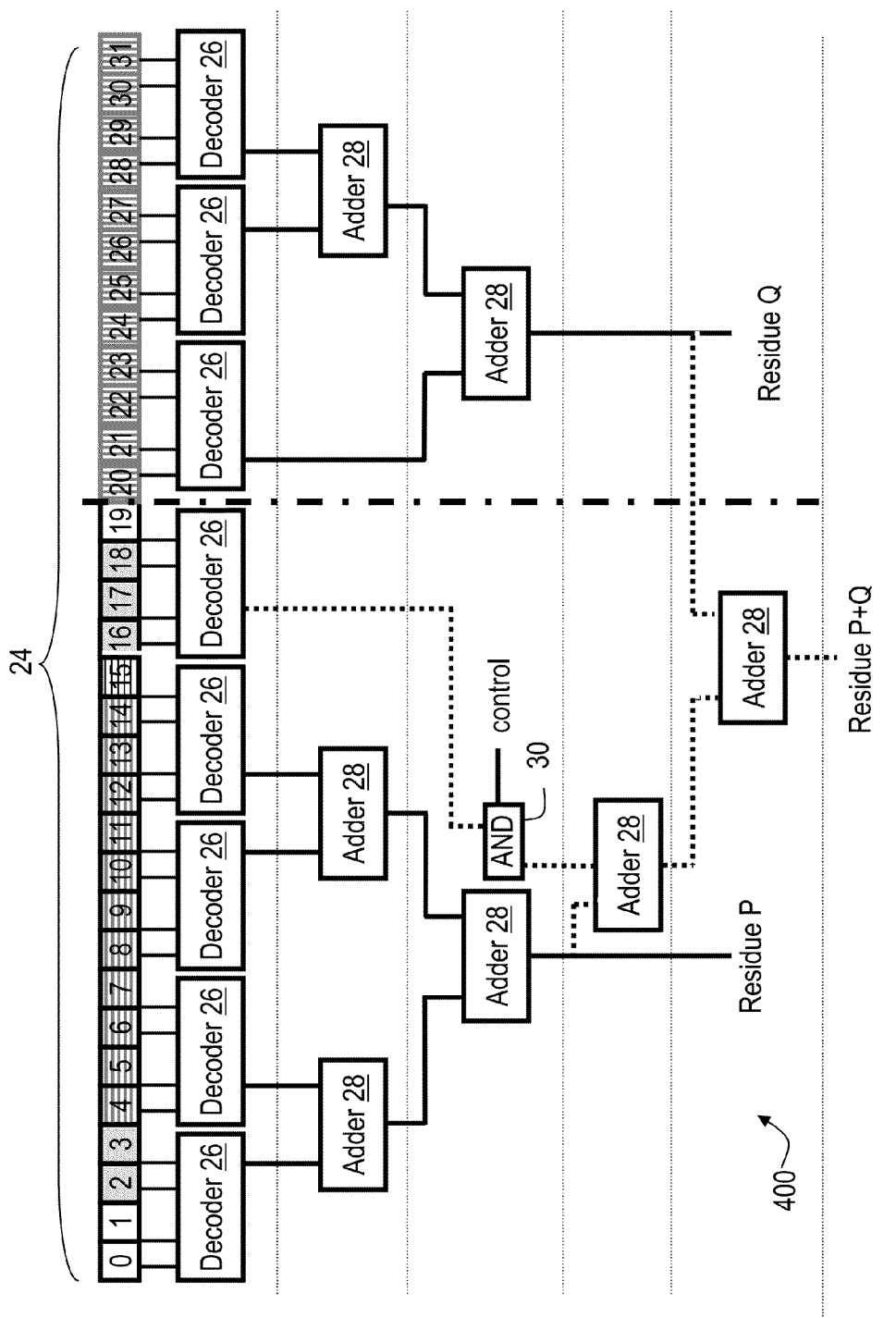
FIG. 4 is a diagram illustrating an asymmetrical split data width residue generation tree for a residue generator configured according to another embodiment of the present disclosure.

With reference to FIG. 4, an exemplary modulo 15 residue generation tree 400, that may be implemented in residue generator 806 (see FIG. 8), is illustrated. Operand register 24 may be configured to store thirty-two bits of a long format operand, starting with an MSB in the register labeled '0' and ending with an LSB in the register labeled '31'. As is shown, operand register 24 is asymmetrically divided and configured to store two short format operands with different sizes (with an operand 'P' included in registers labeled 0-19 and an operand 'Q' included in registers labeled 20-31) for vector operations. As illustrated in FIG. 4, operand 'P' is not aligned and is stored in the registers labeled 2-18 (within a left operand register section including registers 0-19) and operand 'Q' is stored right-aligned in a right operand register section that includes the registers labeled 20-31.

Similar to residue generation tree 23 of FIG. 2, residue generation tree 400 of FIG. 4 includes a plurality of modulo 15 decoders 26 and a plurality of modulo adders (residue condensers) 28. Each decoder 26 is coupled to four adjacent register bits of operand register 24 (for receiving four parallel bits of numerical data) and each decoder 26 decodes the numerical data received from the respective register bits. In this manner, short format operands of unequal size may be supported by asymmetrically partitioning an operand register and residue generators when vector instructions pass unequal length short format operands within a wide dataflow.

As previously noted, decoders 26 transform coded signals into decoded signals that are modulo remainders. Modulo adders 28, positioned at different levels, receive the decoded numerical data from decoders 26. Adders 28 may, for example, be replaced with a series of decoders and multiplexers that perform residue condensing. Outputs of two adjacent pairs of decoders 26 for operand 'P' (i.e., decoders 26 that receive bits from registers labeled 2-18) are coupled to respective inputs of two different adders 28 in a first condenser stage. Inputs of adder 28 that generates a residue for operand 'P' in a second condenser stage are coupled to respective outputs of adders 28 that generate a residue for operand 'P' in the first condenser stage.

An output of decoder 26 that decodes bits for the registers labeled 20-23 for operand 'Q' is coupled to a first input of adder 28 that generates a residue for operand 'Q' and is located in the second residue stage. Outputs of decoders 26 for registers labeled 24-31 are coupled to respective inputs of adder 28 for operand 'Q' in the first condenser stage. An output of adder 28 for operand 'Q' in the first condenser stage is coupled to a second input of adder 28 for operand 'Q' in the second condenser stage. An output of each adder 28 in the second condenser stage may be configured to provide a different residue for a short format operand.

Alternatively, the output of adder 28 for operand 'P' in the second condenser stage may be coupled to a first input of an adder 28 in a third condenser stage. An output of decoder 26 for the registers labeled 16-19 may also be coupled to a second input of adder 28 in the third condenser stage, via AND gate 30. AND gate 30 is configured to pass bits 16-18 for short format operands and bits 16-19 for long format operands responsive to a control signal provided by unillustrated control logic. In this case, the output of adder 28 in the third condenser stage is coupled to a first input of adder 28 in a fourth condenser stage and an output of adder 28 for operand 'Q' in the second condenser stage is coupled to a second input of adder 28 in the fourth condenser stage. An output of adder 28 in the fourth condenser stage is then configured to generate a residue for a long format operand (i.e., residue P+Q). In residue generation tree 400, an operand provided to register 24 may not use all of the input bits. In this case, register bits of an operand in operand register 24 that are not used may be filled with logical zeros (or other bits that do not affect the residue) by unillustrated control logic.

As short format operands do not necessarily fill a section of an operand register, various criteria may be taken into consideration when determining how to position short format data in an operand register. For example, to make best use of existing logic that services an operand register for long format operands, short format operands may be aligned within sections of an operand register to facilitate maximum re-use of the existing logic (e.g., decoders, counters, and comparators). As one example, it may be advantageous to position short format operands asymmetrically within an operand register to pass middle bits of the operand register.

Figure 5:
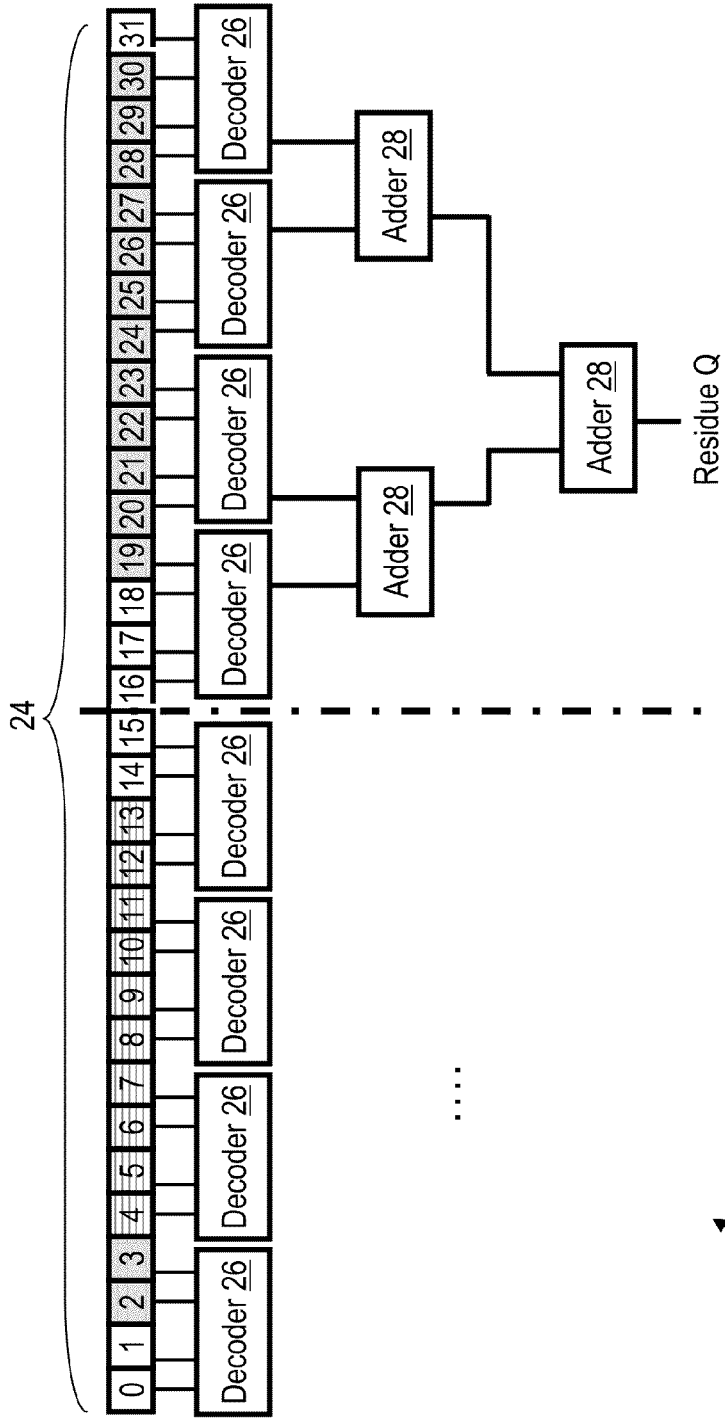
FIG. 5 is a diagram illustrating a residue generation tree that is configured to handle non-aligned short format operands.

With reference to FIG. 5, an exemplary modulo 15 residue generation tree 500, that may be implemented in residue generator 806 (see FIG. 8), is illustrated. Operand register 24 may be configured to store thirty-two bits of a long format operand, starting with an MSB in the register labeled '0' and ending with an LSB in the register labeled '31'. Operand register 24 may also be symmetrically divided and configured to store two short format operands (with an operand 'P' included in a left register section that includes the registers labeled 0-15 and an operand 'Q' included in a right register section that includes the registers labeled 16-31). As illustrated in FIG. 5, operands 'P' and 'Q' are not aligned, operand 'P' is stored in the registers labeled 2-13, and operand 'Q' is stored in the registers labeled 19-30. Similar to residue generation tree 23 of FIG. 2, residue generation tree 500 of FIG. 5 includes a plurality of modulo 15 decoders 26 and a plurality of modulo adders (residue condensers) 28. Each decoder 26 is coupled to four adjacent register bits of operand register 24 (for receiving four parallel bits of numerical data) and each decoder 26 decodes the numerical data received from the respective register bits.

As previously noted, decoders 26 transform coded signals into decoded signals that are modulo remainders. Modulo adders 28, positioned at different levels, receive the decoded numerical data from decoders 26. Adders 28 may, for example, be replaced with a series of decoders and multiplexers that perform residue condensing. Outputs of each adjacent pair of decoders 26 are coupled to inputs of a different adder 28 in a first condenser stage. Inputs of each adder 28 in a second condenser stage are coupled to respective outputs of two adders 28 in the first condenser stage. An output of each adder 28 in the second condenser stage may be configured to provide a different residue for a short format operand or may be coupled to respective inputs of an adder 28 in a third condenser stage (not shown in FIG. 5). In this case, an output of an adder 28 in the third condenser stage is configured to generate a residue for a long format operand. In register 24, operands 'P' and 'Q' are not aligned for rounding or carry-out. It should be appreciated that register bits of an operand in operand register 24 that are not used may be filled with logical zeros (or other bits that do not affect the residue) by unillustrated control logic.

Figure 6:
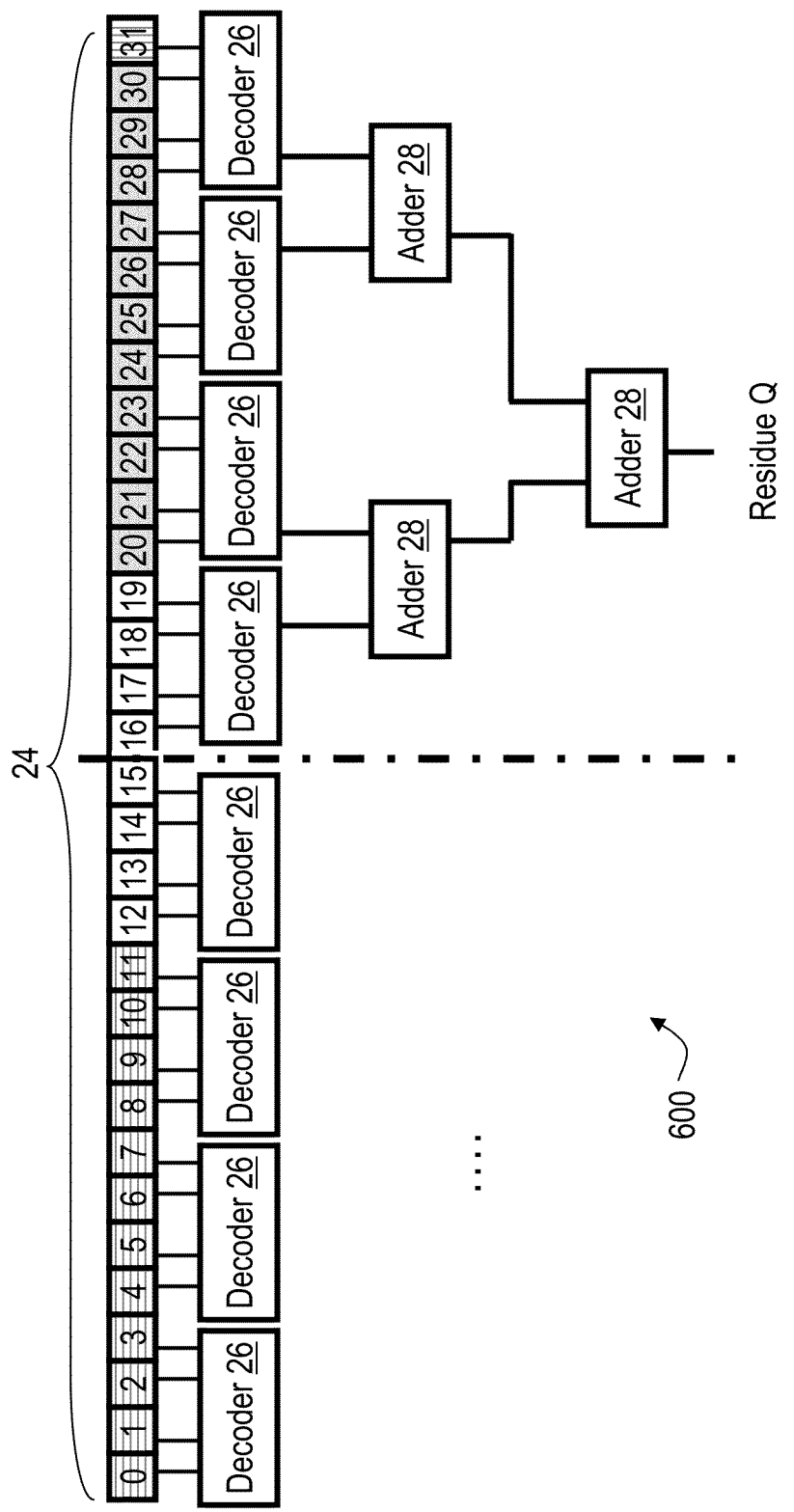
FIG. 6 is a diagram illustrating a residue generation tree that is configured to handle short format operands with a left operand aligned for carry-out and a right operand aligned for rounding.

With reference to FIG. 6, an exemplary modulo 15 residue generation tree 600, that may be implemented in residue generator 806 (see FIG. 8), is illustrated. Operand register 24 may be configured to store thirty-two bits of a long format operand, starting with an MSB in the register labeled '0' and ending with an LSB in the register labeled '31'. Operand register 24 may also be symmetrically divided and be configured to store two short format operands (with an operand 'P' included in a left register section that includes the registers labeled 0-15 and an operand 'Q' included in a right register section that includes the registers labeled 16-31). As illustrated in FIG. 6, operands 'P' and 'Q' are not aligned with each other, operand 'P' is aligned for carry-out, operand 'Q' is aligned for rounding, operand 'P' is stored in the registers labeled 0-11, and operand 'Q' is stored in the registers labeled 20-31. Similar to residue generation tree 23 of FIG. 2, residue generation tree 600 of FIG. 6 includes a plurality of modulo 15 decoders 26 and a plurality of modulo adders (residue condensers) 28. Each decoder 26 is coupled to four adjacent register bits of operand register 24 (for receiving four parallel bits of numerical data) and each decoder 26 decodes the numerical data received from the respective register bits.

As previously noted, decoders 26 transform coded signals into decoded signals that are modulo remainders. Modulo adders 28, positioned at different levels, receive the decoded numerical data from decoders 26. Adders 28 may, for example, be replaced with a series of decoders and multiplexers that perform residue condensing. Outputs of each adjacent pair of decoders 26 are coupled to inputs of a different adder 28 in a first condenser stage. Inputs of each adder 28 in a second condenser stage are coupled to respective outputs of two adders 28 in the first condenser stage. An output of each adder 28 in the second condenser stage may be configured to provide a different residue for a short format operand or may be coupled to respective inputs of an adder 28 in a third condenser stage (not shown in FIG. 6). In this case, an output of an adder 28 in the third condenser stage is configured to generate a residue for a long format operand. In register 24, operand 'P' is left-aligned to use the carry-out logic of bit '0' and operand 'Q' is right-aligned for rounding. It should be appreciated that register bits of an operand in operand register 24 that are not used may be filled with logical zeros (or other bits that do not affect the residue) by unillustrated control logic. It should also be noted, that the residue value of a non-aligned operand can be readily corrected by residue-multiplication (with a multiplier that depends on the numbers of bits that the operand was shifted (e.g., multiply by 2 for a one bit shift left)). Aligning operand 'P' for carry-out facilitates reuse of carry-out logic that detects and handles carry-outs for long format operands. That is, a short format operand in a left register section may utilize the carry-out logic designed for long format operands. Aligning the short format operand in a right register section to a rightmost position facilitates reuse of rounding logic designed for long format operands.

Figure 7:
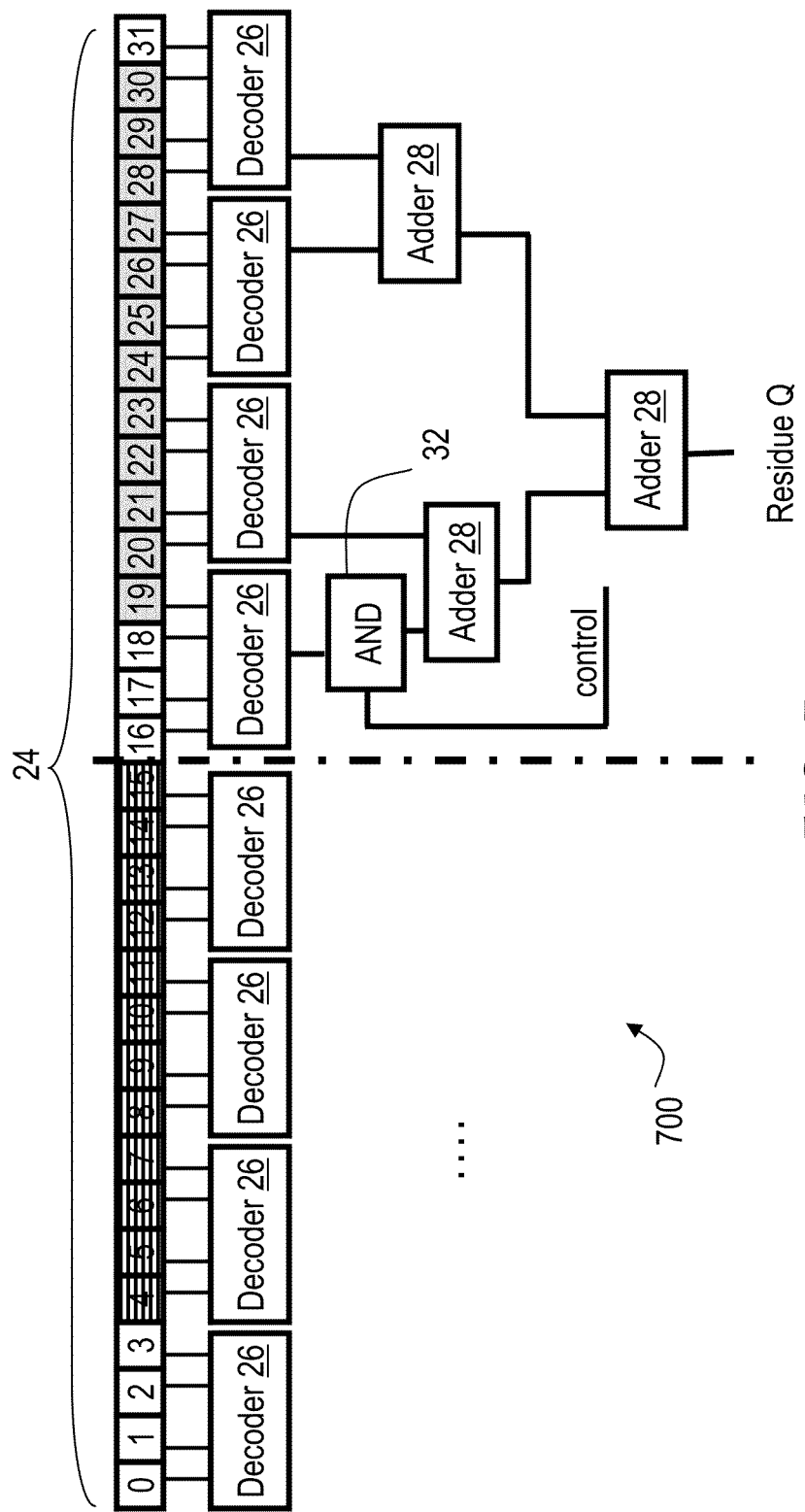
FIG. 7 is a diagram illustrating a residue generation tree that is configured to handle non-aligned short format operands according to an embodiment of the present disclosure.

With reference to FIG. 7, an exemplary modulo 15 residue generation tree 700, that may be implemented in residue generator 806 (see FIG. 8), is illustrated. Operand register 24 may be configured to store thirty-two bits of a long format operand, starting with an MSB in the register labeled '0' and ending with an LSB in the register labeled '31'. Operand register 24 may also be symmetrically divided and be configured to store two short format operands (with an operand 'P' included in the registers labeled 0-15 and an operand 'Q' included in the registers labeled 16-31). As illustrated in FIG. 6, operands 'P' and 'Q' are not aligned identically with respective left and right register sections, operand 'P' is right-aligned in a left register section, operand 'Q' is not aligned, operand 'P' is stored in the registers labeled 4-15, and operand 'Q' is stored in the registers labeled 19-30. Similar to residue generation tree 23 of FIG. 2, residue generation tree 700 of FIG. 7 includes a plurality of modulo 15 decoders 26 and a plurality of modulo adders (residue condensers) 28. Each decoder 26 is coupled to four adjacent register bits of operand register 24 (for receiving four parallel bits of numerical data) and each decoder 26 decodes the numerical data received from the respective register bits.

As previously noted, decoders 26 transform coded signals into decoded signals that are modulo remainders. Modulo adders 28, positioned at different levels, receive the decoded numerical data from decoders 26. Adders 28 may, for example, be replaced with a series of decoders and multiplexers that perform residue condensing. Outputs of two adjacent decoders 26 for operand 'Q' (i.e., decoders 26 that receive bits from registers labeled 24-31) are coupled to respective inputs of adder 28 in a first condenser stage. An output of decoder 26 that decodes bits for the registers labeled 20-23 for operand 'Q' is coupled to a first input of adder 28 that generates a residue for operand 'Q' and is located in the second residue stage. An output of decoder 26 for operand 'Q' that decodes bits for the registers labeled 16-19 is coupled to a second input of adder 28 in the first condenser stage for operand 'Q', via an AND gate 32. An output of each adder 28 in the first condenser stage is coupled to a different input of an adder 28 in the second condenser stage to provide a different residue for a short format operand. AND gate 32 allows the connected data-bits to be included in the residue-generation only when a control signal (from unillustrated control logic) is asserted. In one or more embodiments, control logic only provides an asserted control signal for long format operands.

Figure 8:
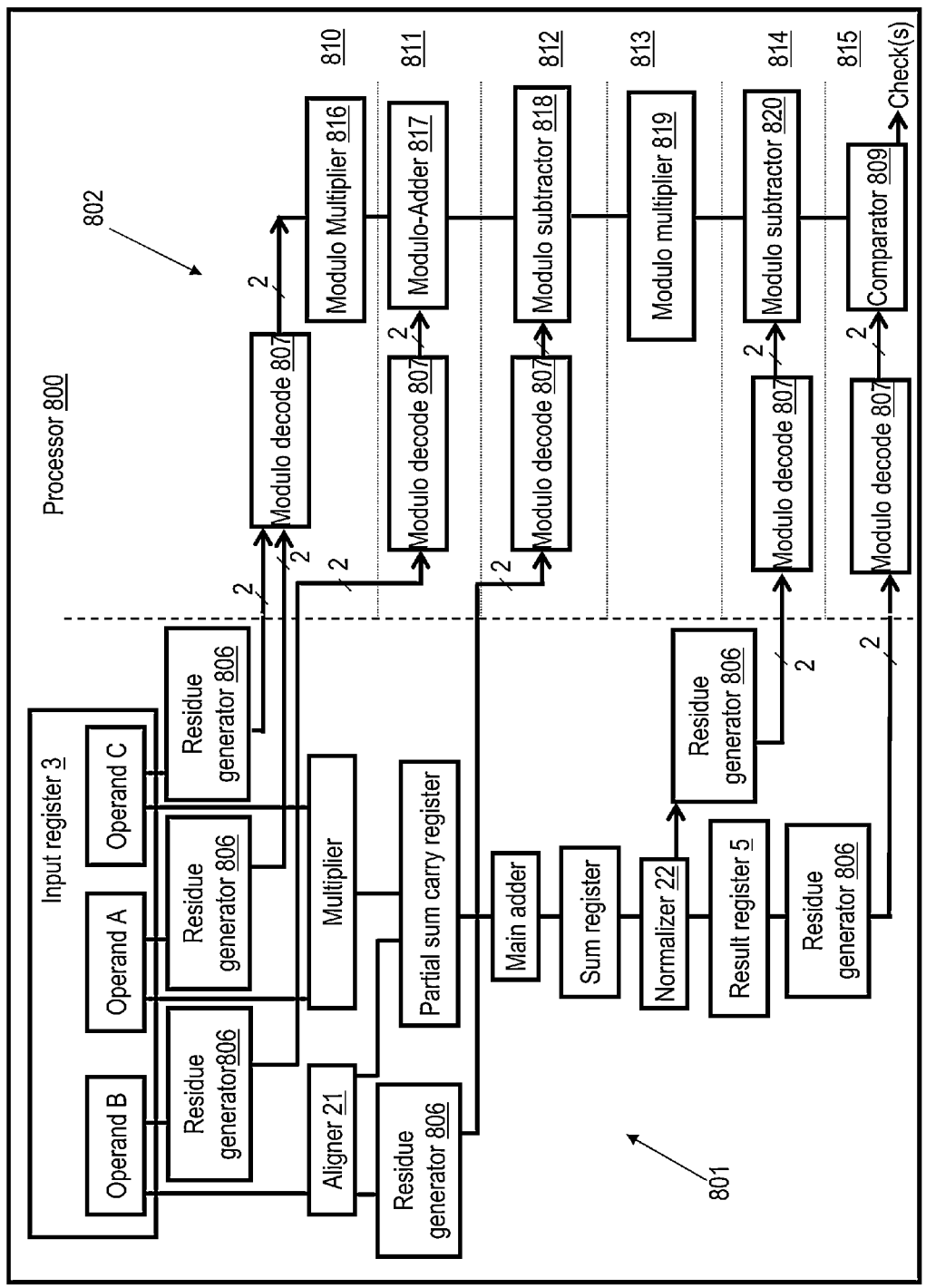
FIG. 8 is a diagram illustrating an FPU with a residue generator having split data residue generation trees according to an embodiment of the present disclosure.

With reference to FIG. 8, an exemplary floating point unit (FPU) of a processor (that includes a residue generating circuit that performs residue checking according to the present disclosure) is illustrated. Residue checking is performed within a residue checking flow 802, by performing the same operations on the residue as those performed on operands by the FPU, in parallel with data flow 801 within the FPU. Operands A, B and C are provided by an input register 3 in data flow 801. Operands A, B and C may be long format operands or may each include multiple short format operands. In any event, operands A, B and C are processed differently based on different functional elements, such as aligner 21 and normalizer 22, and a result is provided by a result register 5. Residues are generated at illustrated positions within data flow 801 by residue generators 806. Modulo decoders 807, which are coupled to residue generators 806, provide residue modulos to different functional elements (i.e., modulo multiplier 816, modulo adder 817, modulo subtractor 818, modulo subtractor 820, and comparator 809) within flow 802.

In a first stage 810 of flow 802, the residue modulos of operands A and B are multiplied by modulo multiplier 816. In a second stage 811 of flow 802, the residue modulo from operand B is added to the product-residue modulo from stage 810 using modulo adder 817. In a third stage 812 of flow 802, the residue modulo of bits lost at aligner 21 is subtracted by modulo subtractor 818 from the sum of second stage 811. During the residue checking operation, residue corrections to the actual residue value corresponding to the manipulated data in flow 801 may be necessary. For example, a normalization shift correction may be necessary. As such, in a fourth stage 813 of checking flow 802, residue correction of the normalization shift is performed by modulo multiplier 819. Then, in a fifth stage 814 of flow 802, a subtraction of the bits lost at normalizer 22 is performed by modulo subtractor 820. Finally, in a sixth stage 815 of flow 802, a check operation is performed by comparator 809. That is, comparator 809 compares the result provided by modulo subtractor 820 with the residue modulo of the result provided by result register 5 of flow 801.

Figure 9:
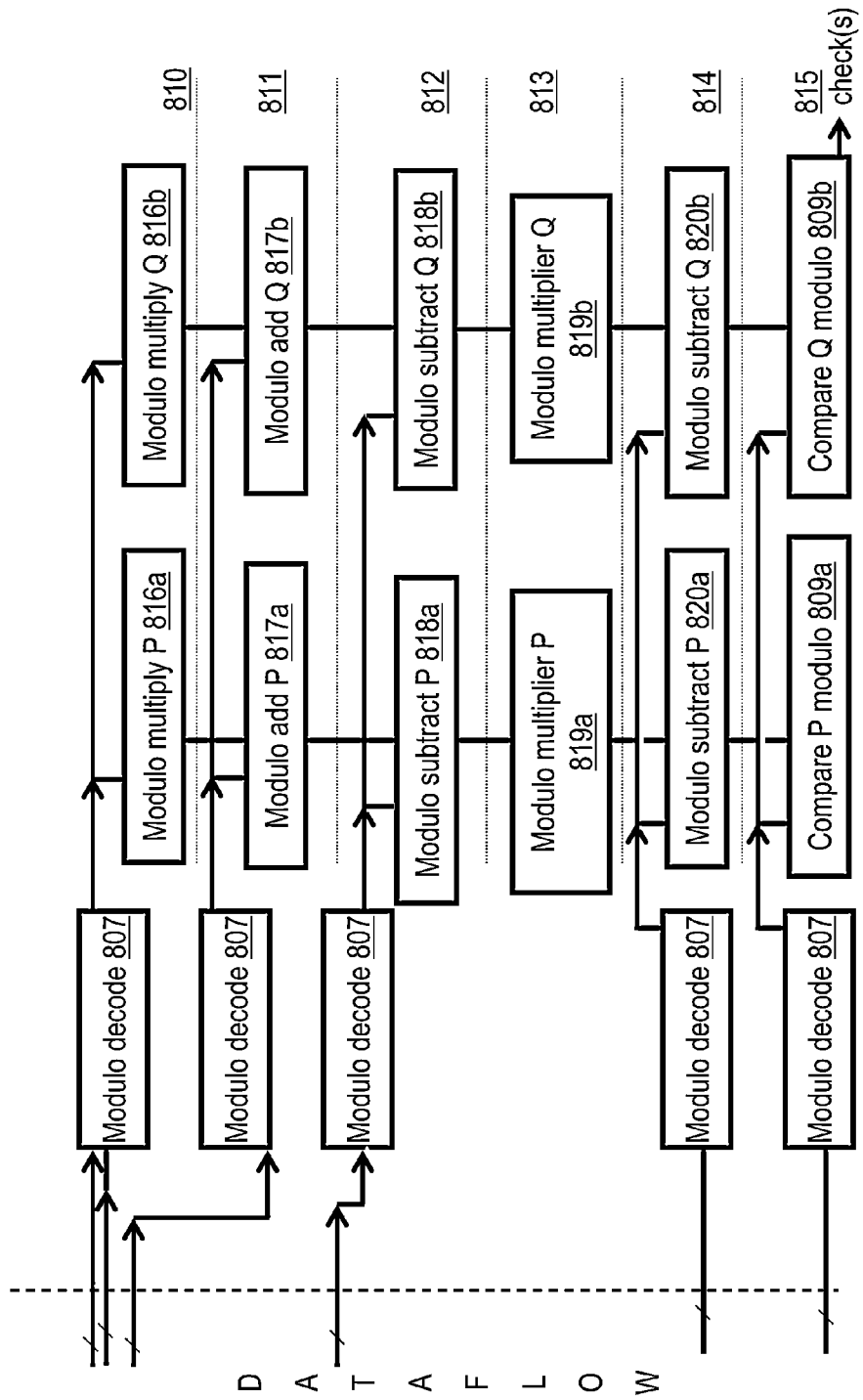
FIG. 9 is a diagram illustrating an exemplary residue checking flow for the FPU of FIG. 8.

With reference to FIG. 9, flow 802 is illustrated in further detail. In first stage 810, the residue modulos (i.e., modulo P and modulo Q) of operands A and B are multiplied by modulo multipliers 816a and 816b. Next, in second stage 811, the residue modulo from operand B is added to the product-residue modulo from stage 810 using modulo adders 817a and 817b. Then, in third stage 812, the residue modulo of bits lost at aligner 21 is subtracted by modulo subtractors 818a and 818b from the sum of second stage 811. During the residue checking operation, residue corrections to the actual residue value corresponding to the manipulated data in flow 801 may be necessary. For example, a normalization shift may be necessary. As such, in a fourth stage 813, residue correction of the normalization shift is performed by modulo multipliers 819a and 819b. Then, in a fifth stage 814, a subtraction of the bits lost at normalizer 22 is performed by modulo subtractors 820a and 820b. Finally, in a sixth stage 815, a check operation is performed by comparators 809a and 809b. That is, comparators 809a and 809b compare the results provided by modulo subtractors 820a and 820b with the residue modulos of the result provided by result register 5 of flow 801.

Figure 10:
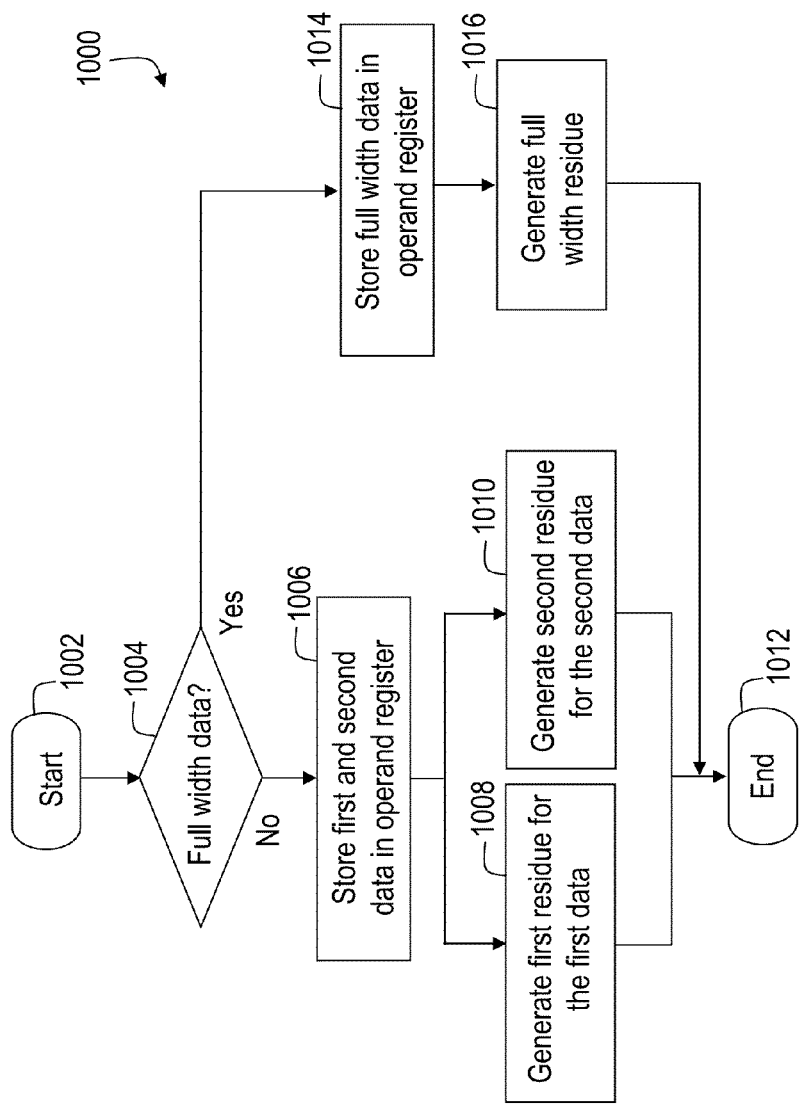
FIG. 10 is a flowchart of an exemplary residue checking process for the FPU of FIG. 8.

With reference to FIG. 10, a flowchart of an exemplary process 1000, implemented within residue generator 806 of processor 800, is illustrated. In block 1002 process 1000 is initiated, at which point control transfers to block 1004. In block 1004, processor 800 determines whether full width data is indicated (e.g., by examining one or more bits of a control register). In response to full width data not being indicated in block 1004, control transfers to block 1006, where processor 800 causes first data to be loaded into a first section of operand register 24 (of residue generator 806) and second data to be loaded into a second section operand register 24 (of residue generator 806). In one or more embodiments, the first section of operand register 24 includes a different number of registers than the second section of operand register 24. As noted above, multiple residue generators 806 are implemented within processor 800 to perform error detection for an execution unit of processor 800.

Next, in blocks 1008 and 1010, residue generator 806 generates a first residue for the first data in parallel with a second residue for the second data. As discussed in detail above, the residues for the first and second data are utilized by a residue checking circuit (employed in residue checking flow 802, which is performed in parallel with data flow 801) to determine whether an error has occurred in mathematical calculations performed by an execution unit of processor 800. In the event an error occurred, processor 800 restarts the mathematical calculations in the execution unit. Following blocks 1008 and 1010, process 1000 terminates in block 1012.

In response to full width data being indicated in block 1004, control transfers to block 1014, where processor 800 causes full width data to be loaded into operand register 24 (of residue generator 806). Next, in block 1016, processor 800 generates a full width residue for the full width data, as is discussed in detail above. Following block 1016, process 1000 terminates in block 1012.

Figure 11:
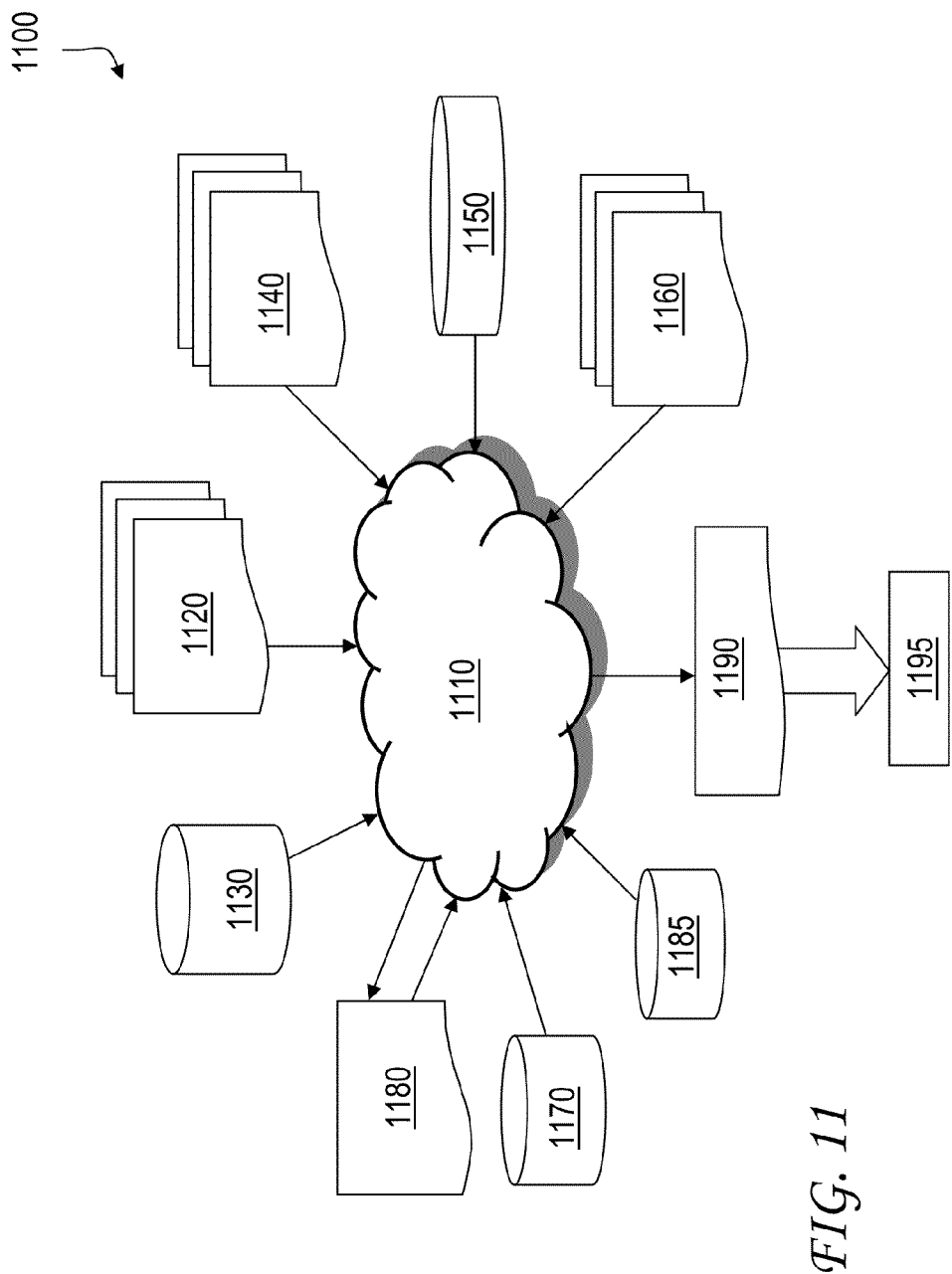
FIG. 11 is a flow diagram of a design process used in semiconductor design, manufacture, and/or test.

FIG. 11 shows a block diagram of an exemplary design flow 1100 used for example, in semiconductor IC logic design, simulation, test, layout, and manufacture. Design flow 1100 includes processes, machines and/or mechanisms for processing design structures or devices to generate logically or otherwise functionally equivalent representations of the design structures and/or devices described above and shown in FIGS. 3-10. The design structures processed and/or generated by design flow 1100 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1100 may vary depending on the type of representation being designed. For example, a design flow 1100 for building an application specific IC (ASIC) may differ from a design flow 1100 for designing a standard component or from a design flow 1100 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 1120 that is preferably processed by a design process 1110. Design structure 1120 may be a logical simulation design structure generated and processed by design process 1110 to produce a logically equivalent functional representation of a hardware device. Design structure 1120 may also or alternatively comprise data and/or program instructions that when processed by design process 1110, generate a functional representation of the physical structure of a hardware device. Whether representing functional and/or structural design features, design structure 1120 may be generated using electronic computer-aided design (ECAD) such as implemented by a core developer/designer. When encoded on a machine-readable data transmission, gate array, or storage medium, design structure 1120 may be accessed and processed by one or more hardware and/or software modules within design process 1110 to simulate or otherwise functionally represent an electronic component, circuit, electronic or logic module, apparatus, device, or system such as those shown in FIGS. 3-10. As such, design structure 1120 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1110 preferably employs and incorporates hardware and/or software modules for synthesizing, translating, or otherwise processing a design/simulation functional equivalent of the components, circuits, devices, or logic structures shown in FIGS. 3-10 to generate a netlist 1180 which may contain design structures such as design structure 1120. Netlist 1180 may comprise, for example, compiled or otherwise processed data structures representing a list of wires, discrete components, logic gates, control circuits, I/O devices, models, etc. that describes the connections to other elements and circuits in an integrated circuit design. Netlist 1180 may be synthesized using an iterative process in which netlist 1180 is resynthesized one or more times depending on design specifications and parameters for the device. As with other design structure types described herein, netlist 1180 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1110 may include hardware and software modules for processing a variety of input data structure types including netlist 1180. Such data structure types may reside, for example, within library elements 1130 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1140, characterization data 1150, verification data 1160, design rules 1170, and test data files 1185 which may include input test patterns, output test results, and other testing information. Design process 1110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1110 without deviating from the scope and spirit of the invention. Design process 1110 may also include modules for performing standard circuit design processes such as timing analysis, verification, design rule checking, place and route operations, etc.

Design process 1110 employs and incorporates logic and physical design tools such as HDL compilers and simulation model build tools to process design structure 1120 together with some or all of the depicted supporting data structures along with any additional mechanical design or data (if applicable), to generate a second design structure 1190. Design structure 1190 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1120, design structure 1190 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 3-10. In one embodiment, design structure 1190 may comprise a compiled, executable HDL simulation model that functionally simulates the devices shown in FIGS. 3-10.

Design structure 1190 may also employ a data format used for the exchange of layout data of integrated circuits and/or symbolic data format (e.g., information stored in a GDSII (GDS2), GL1, OASIS, map files, or any other suitable format for storing such design data structures). Design structure 1190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 3-10. Design structure 1190 may then proceed to a stage 1195 where, for example, design structure 1190: proceeds to tape-out, is released to manufacturing, is released to a mask house, is sent to another design house, is sent back to the customer, etc.

Accordingly, residue generation techniques have been disclosed herein that can be advantageously employed on execution units that support vector operations.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of generating a residue for an execution unit that supports vector operations using a residue generating circuit, comprising:
    storing first data in a first section of an operand register and second data in a second section of the operand register;
    generating, using a first residue generation tree that is coupled to the first section of the operand register, a first residue for the first data; and
    generating, using a second residue generation tree that is coupled to the second section of the operand register, a second residue for the second data, wherein the first section of the operand register includes a different number of register bits than the second section of the operand register;
    wherein the first and second data are each twenty-three bits wide and each correspond to different short format operands, wherein the operand register is sized to receive a fifty-two bit wide long format operand, and wherein register bits in the operand register that do not receive the different short format operands are filled with a value that does not affect values of the first and second residues.

2. The method of claim 1, wherein at least one register bit in the first section of the operand register is unused.

3. The method of claim 1, wherein at least one register bit in the second section of the operand register is unused.

4. The method of claim 1, wherein at least one register bit in each of the first and second sections of the operand register is unused.

5. The method of claim 1, wherein multiple register bits in each of the first and second sections of the operand register are unused.

6. The method of claim 1, wherein the first and second data form a long format operand and the method further comprises:
    generating a full data width residue for the long format operand based on the first and second residues.

* * * * *